US007363488B2

(12) United States Patent
Hinkson

(10) Patent No.: US 7,363,488 B2
(45) Date of Patent: Apr. 22, 2008

(54) METHOD AND APPARATUS FOR PREFILTERING RECEIVED MESSAGES IN A SECURITY SYSTEM

(75) Inventor: Richard H. Hinkson, Plainview, NY (US)

(73) Assignee: Honeywell International Inc., Morristown, NJ (US)

( * ) Notice: Subject to any disclaimer, the term of this patent is extended or adjusted under 35 U.S.C. 154(b) by 846 days.

(21) Appl. No.: 10/213,506

(22) Filed: Aug. 7, 2002

(65) Prior Publication Data

US 2004/0030886 A1 Feb. 12, 2004

(51) Int. Cl.
*H04L 9/00* (2006.01)
*H04L 12/28* (2006.01)

(52) U.S. Cl. ....................................... 713/153; 370/235

(58) Field of Classification Search ..................... None
See application file for complete search history.

(56) References Cited

U.S. PATENT DOCUMENTS 6,307,837 B1* 10/2001 Ichikawa et al. ........... 370/230
6,816,455 B2* 11/2004 Goldberg et al. ........... 370/230
2004/0013112 A1* 1/2004 Goldberg et al. ........... 370/389
2004/0185845 A1* 9/2004 Abhishek et al. ........ 455/422.1
2006/0010265 A1* 1/2006 Aiken et al. .................. 710/33

* cited by examiner

*Primary Examiner*—Nasser Moazzami
*Assistant Examiner*—Brandon S Hoffman
(74) *Attorney, Agent, or Firm*—Anthony R. Barkume, P.C.

(57) ABSTRACT

In a security system having wireless transmitters, a wireless receiver module, and a control panel processing signals sent from the transmitters to the receiver module, the present invention is a method of prefiltering the received wireless signals by first generating a prefiltering map by the control panel. For each of the transmitters in the security system, an algorithm such as a hashing function is performed on the identification number of each transmitter enrolled in the system with the control panel. The results of the algorithm are stored in a prefiltering map, which is then sent to the receiver module(s). For each wireless message received from a transmitter, the receiver module extracts from the message the identification number of the transmitter that transmitted the message. The receiver module then performs the algorithm on the extracted identification number, and then compares the result against the prefiltering map. The receiver module will forward the message to the control panel if the comparison result is true; or it will discard the message if the comparison result is false.

19 Claims, 5 Drawing Sheets

METHOD AND APPARATUS FOR PREFILTERING RECEIVED MESSAGES IN A SECURITY SYSTEM

FIELD OF THE INVENTION

This invention relates to security systems, and in particular to a method and system for prefiltering received wireless messages at the receiver module in order to send to the control panel only those messages that likely originated from an enrolled transmitter and thereby reduce the processing requirements of the control panel.

BACKGROUND OF THE INVENTION

The present invention addresses problems caused by wireless security systems that are located in close proximity to other wireless security systems of the same design and operating frequency from the same manufacturer. As the development of these systems progresses, the effective range of the transmitter/receiver combinations also has increased dramatically. While increased effective range of the transmitters improves the reliability of the communications, it can also increase the reception of unwanted signals from nearby security systems. In a condominium or townhouse complex, for example, the housing units are typically clustered together. As the number of identical wireless alarm systems installed in these units increases, the amount of unwanted signal traffic that each system receives also increases.

In the current implementations of security systems, the wireless receiver and control panel are connected using a communications bus. As more unwanted signals are received, the amount of traffic on the bus increases, as well as the number of messages that must be processed by the control panel. The situation is compounded when a system has more than one receiver module. Even though a control panel will discard any message from a transmitter that is not enrolled in its memory (i.e. "learned" by the control panel during initialization or installation of the system), the multitude of such extraneous messages that pass through the receiver modules (since the have the same operating frequency and data protocols) to the control panel is problematic.

It is therefore an object of the present invention to provide a wireless security system that overcomes the problems of the prior art mentioned above.

It is also an object of the present invention to provide such a security system that ameliorates the unwanted processing requirements on the control panel due to nearby transmitters that are not part of the system.

In particular, it is an object of the present invention to provide such a security system that can process the received messages at the receiver module and pre-filter the messages that did not originate from an enrolled transmitter, so that such unwanted messages are not passed on to the control panel.

SUMMARY OF THE INVENTION

The present invention is thus a method and apparatus for use in a security system that performs a prefiltering function on messages received by the receiver module, prior to passing them on to the control panel for processing. This prefiltering eliminates a very large percentage of unwanted messages from reaching the control panel, thus reducing the deleterious effects of the problems mentioned above. The present invention takes advantage of the fact that in current implementations of security systems, the database of the identification numbers (i.e. serial numbers) of the system's transmitters is stored in the control panel. All received messages are sent from the receiver module to the control and analyzed by the control.

In order to reduce the amount of traffic between the RF receiver module and the control panel, this invention introduces a unique method of pre-filtering the received messages in the RF receiver module without overburdening the storage requirements in the receiver module. This invention uses a pre-filtering function to decide if a received message should be passed to the control panel, simplifying the amount of storage needed in the receiver module and reducing the processing required by the control panel.

Therefore, the present invention is utilized in a security system that has a plurality of wireless transmitters having a unique identification number, at least one wireless receiver module in communication with each of the transmitters, and a control panel connected to the receiver module for processing signals sent from the transmitters to the receiver module. The present invention is a method of prefiltering the received wireless signals by first generating a prefiltering map by the control panel. For each of the transmitters in the security system, an algorithm such as a hashing function is performed on the identification number of each transmitter enrolled in the system with the control panel. The results of the algorithm are stored in a prefiltering map, which is then sent to the receiver module(s) in the system for storage and subsequent use.

In operation, for each wireless message received by the receiver module from a transmitter, the receiver module first extracts from the message the identification number of the transmitter that transmitted the message. The receiver module then performs the algorithm (previously used at the control panel to generate the prefiltering map) on the extracted identification number. The receiver module then compares the result against the prefiltering map previously stored. The receiver module will then forward the message to the control panel if the comparison result shows a match (is true); or it will discard the message if the comparison result is false.

For example, the algorithm may be a hashing function selected to provide an N-bit result, wherein N is in the range of 4-8 bits. The prefiltering map will have $2^N$ bit positions, and a bit is set in the map in the position that corresponds to the result of the hashing function for each transmitter. For example, if the hashing function is selected to provide an 8-bit result, then the prefiltering map will have 256 bit positions.

DETAILED DESCRIPTION OF THE INVENTION

Figure 1:
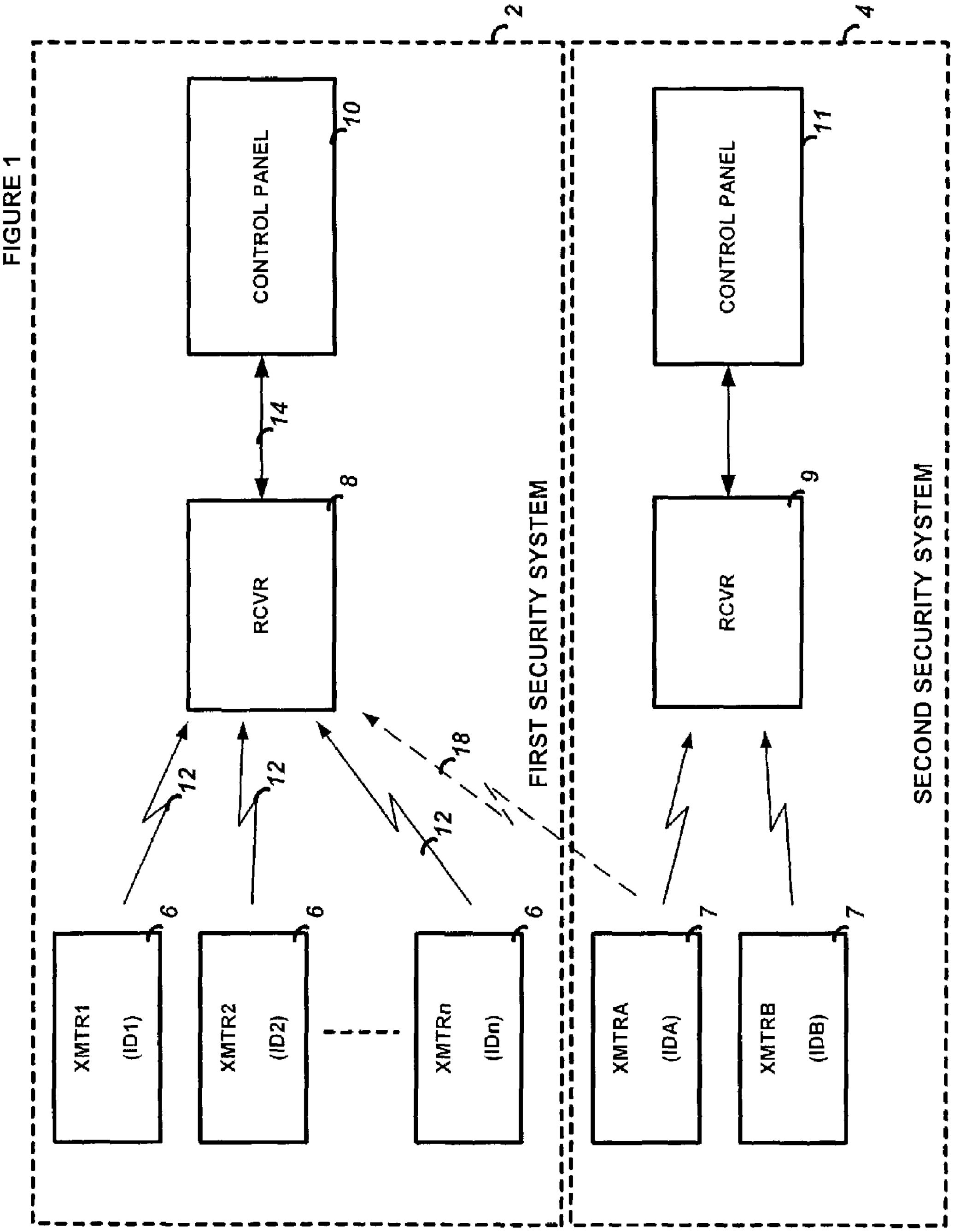
FIG. 1 is a block diagram of the preferred embodiment of the present invention.

The preferred embodiment of the present invention will now be described with respect to the Figures. FIG. 1 illustrates a block diagram of the preferred embodiment of the present invention. A first security system 2 is shown, which includes a number of wireless transmitters 6, which are labeled XMTR1, XMTR2 . . . XMTRn, where n is the number of transmitters enrolled with the first security system 2. Also shown are a first wireless receiver module 8, which receives wireless messages 12 from each of the transmitters 6, and a first control panel 10 in wired communication with the receiver module 8, such as by a wired data bus 14 or the like. Other components of the first security system 2, such as a dialer, siren, etc., are not shown for the sake of clarity, but are well known in the art of security systems. Typically, the transmitters 6 are associated with detectors such as motion sensors, door closure detectors, smoke alarms, and the like, which operate to monitor a condition of the premises and send status messages to the control panel via the wireless transmitter/receiver module pair. These detectors are also not shown here for the sake of clarity, but are well known in the art of security systems.

Figure 5:
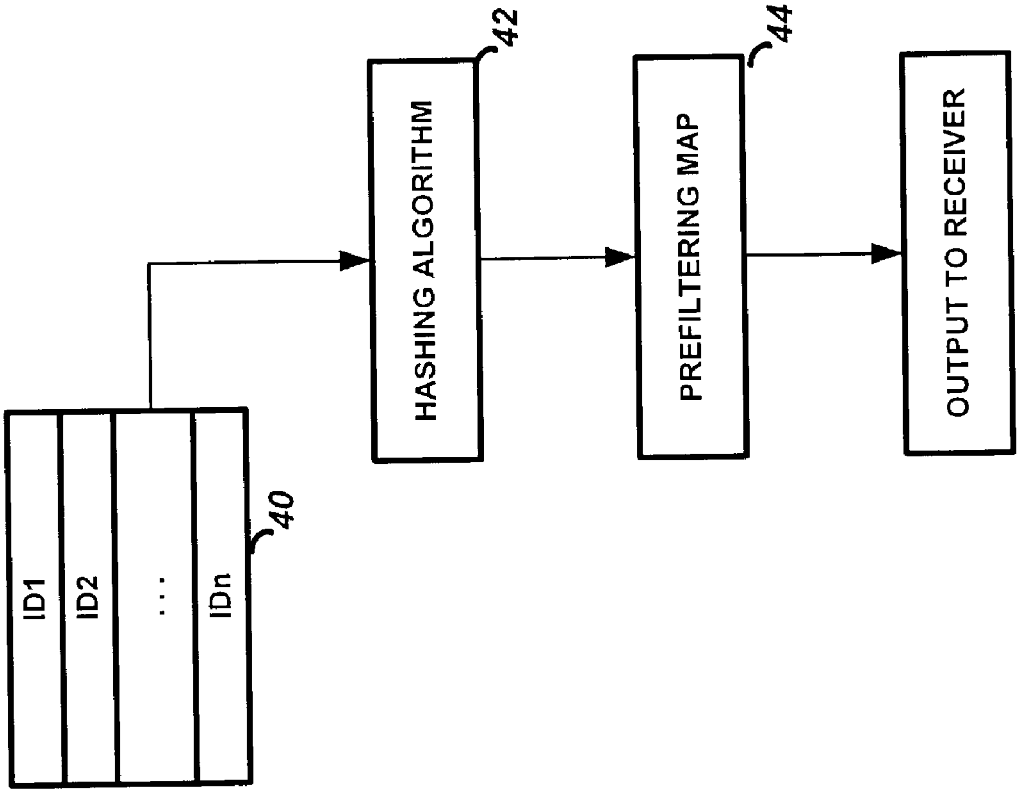
FIG. 5 illustrates the generation of the prefiltering map at the control panel of the present invention.

Transmitter enrollment, also referred to in the art as "learning," is a process whereby the transmitter 6 will be caused to transmit a message through the receiver module 8 to the control panel 10 as part of the installation procedure. The control panel 10 will store a unique identification number (IDn) associated with each transmitter 6 (which typically will be a unique serial number of the transmitter 6) in an ID table 40 as shown in FIG. 5. During normal operation of the security system, when the control panel receives a message from a transmitter 6 via a receiver module 8, it will first check the ID table 40 to determine if that message (which will contain the unique ID of the originating transmitter 6) was received from a transmitter listed in that table 40. In the event that the transmission originated with a transmitter 6 that was not enrolled with the control panel 10 (such as if it comes from a transmitter in a nearby system), then it will ignore the message. Thus, in this system 2, ID1, ID2, . . . IDn are listed in table 40.

Thus, a nearby security system such as the second security system 4 may have a number of transmitters 7, a wireless receiver module 9, and a control panel 11 as shown in FIG. 1. When these systems operate at the same frequency and with the same data protocols (such as when made by the same manufacturer), the likelihood of cross-traffic of data messages (i.e. messages originating with a transmitter 7 and received by the receiver module 8, shown as signal 18 in FIG. 1) is increased.

In order to solve this problem, the present invention uses a prefiltering map to determine which messages were sent by non-enrolled transmitters, and which were likely sent by enrolled transmitters. One way to solve this problem would be to store a copy of the entire ID table 40 at each receiver module 8 of the system (rather than, or in addition to, storing the table 40 at the control panel 10 as currently done). However, this would require an extraordinary amount of memory in each receiver module, since each transmitter ID is typically 24 bits long and a typical security system could have as many as 50 or more transmitters enrolled with the system (thus requiring 1200 bits or more of memory in each receiver module).

The present invention instead provides for the generation by the control panel of a prefiltering map, which is then stored at each of the receiver modules for subsequent filtering of messages during operation of the system. During installation (or after the addition of a new transmitter 6 to the system), the control panel will operate on the identification number of each transmitter in the system with a predefined algorithm such as a hashing function. Hashing functions, which are well known in the art, will generate a number that can be just about any number of bits. In the preferred embodiment, the number of bits in the result of the hashing function algorithm will be in the range of 4-8 bits, preferably 8 bits, so that there will be 256 possible results. In general, a hashing function that produces a result on N-bits will yield $2^N$ possible results.

As shown in FIG. 5, the 8-bit result of the hashing function 42 will then be used to specify the location of a bit to be set in a 256-bit map 44. Thus, for example, if the result of the hashing function is 01001100, then the $76^{th}$ bit position in the prefiltering map 44 will be set to logic 1 (true).

After the hashing conversion is performed on all enrolled transmitters, the prefiltering map will have a number of bits set in the 256-bit map. This map is sent via the data bus 14 to all receiver modules in the system and stored in a local memory of the receiver module as prefiltering map 30.

Figure 2:
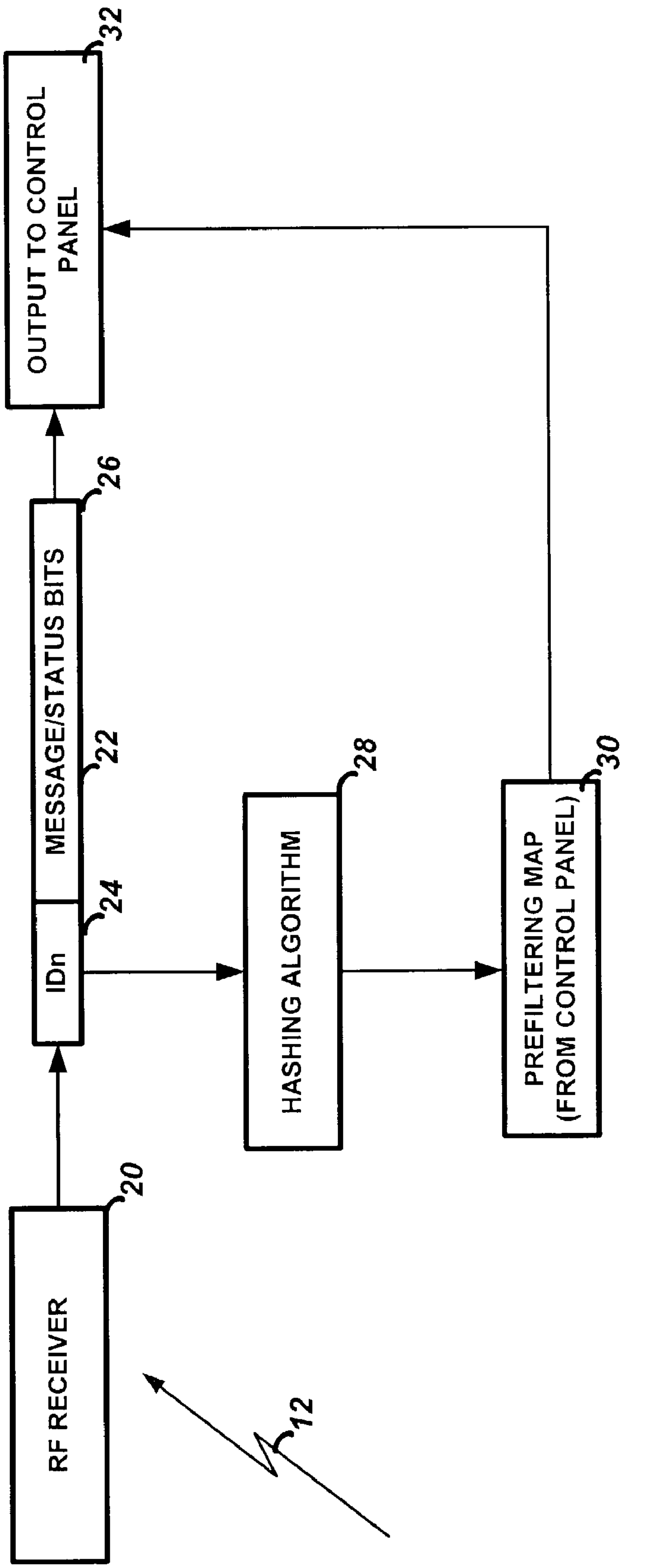
FIG. 2 is a detailed diagram of the circuitry in the receiver module of the present invention.

FIG. 2 illustrates a block diagram of the receiver module 8 that operates in accordance with the preferred embodiment of the present invention. During normal operation of the system, an RF message 12 (or 18) is detected by the RF receiver 20 as well known in the art. After conversion of the RF message to a digital message 26 (which includes transmitter identification number or ID bits 24 and message/status bits 22), the ID bits are extracted and input into a hashing algorithm 28, which is the same algorithm (e.g. hashing function) that was used by the control panel to generate the prefiltering map 30. The receiver module will then take the result of the hashing algorithm 28, which is an 8-bit number, to determine the bit location in the prefiltering map 30. The corresponding bit location in the receiver module's prefiltering map 30 is checked. If that bit in the map is set, it indicates that the serial number may be present in the control panel's ID table, and the message will be forwarded to the control panel by output 32 for normal processing. If the bit is not set in the map (i.e. it is logic 0), then the receiver module will discard the message since there is no chance that the serial number will be found in the ID table 40 at the control panel. In this way most non-enrolled serial numbers from a nearby wireless system will be prevented, by the receiver module(s) of a given system, from being unnecessarily passed on to the given system's control panel. In our example, the hashing function yields the result 01001100, so the $76^{th}$ bit is checked in the map 30. If the $76^{th}$ bit is true, then the message is passed on to the control panel; if false, then the message is discarded.

Thus, when the receiver 8 receives a stray message 18 (see FIG. 1) from a transmitter 7 of the second security system 4 that was intended for (and likely also received by) second receiver 9, the receiver 8 will perform the prefiltering process as described herein on that signal. It will extract IDA from the transmitter message 18, perform the hashing function on the IDA, and produce an 8-bit result. The bit in the prefiltering map 30 corresponding to that result will be checked; since that bit will likely not be set, the message 18 will be filtered and not sent on to the control panel 10.

It is possible that two or more 24-bit identification numbers may provide the same 8-bit hashing result. Thus, it would be possible for a non-enrolled transmitter to provide the same result as an enrolled one. In this case, a stray message from the non-enrolled transmitter would be passed on to the control panel, but the control panel would determine that the message originated from a non-enrolled transmitter and simply ignore it as in the prior art systems. However, this system will not discard a valid transmission since a positive result will always be passed on.

An example of the hashing function algorithm that may be used in the present invention would be a cyclic redundancy check (CRC), which is well known in the art, and typically used for transmission error detection. A CRC is accomplished with various combinations of shift registers and exclusive-OR gates, and will produce a unique (or nearly unique) number for a given input bit stream. The CRC may be accomplished in either software, hardware, or a combination of both.

Figure 3:
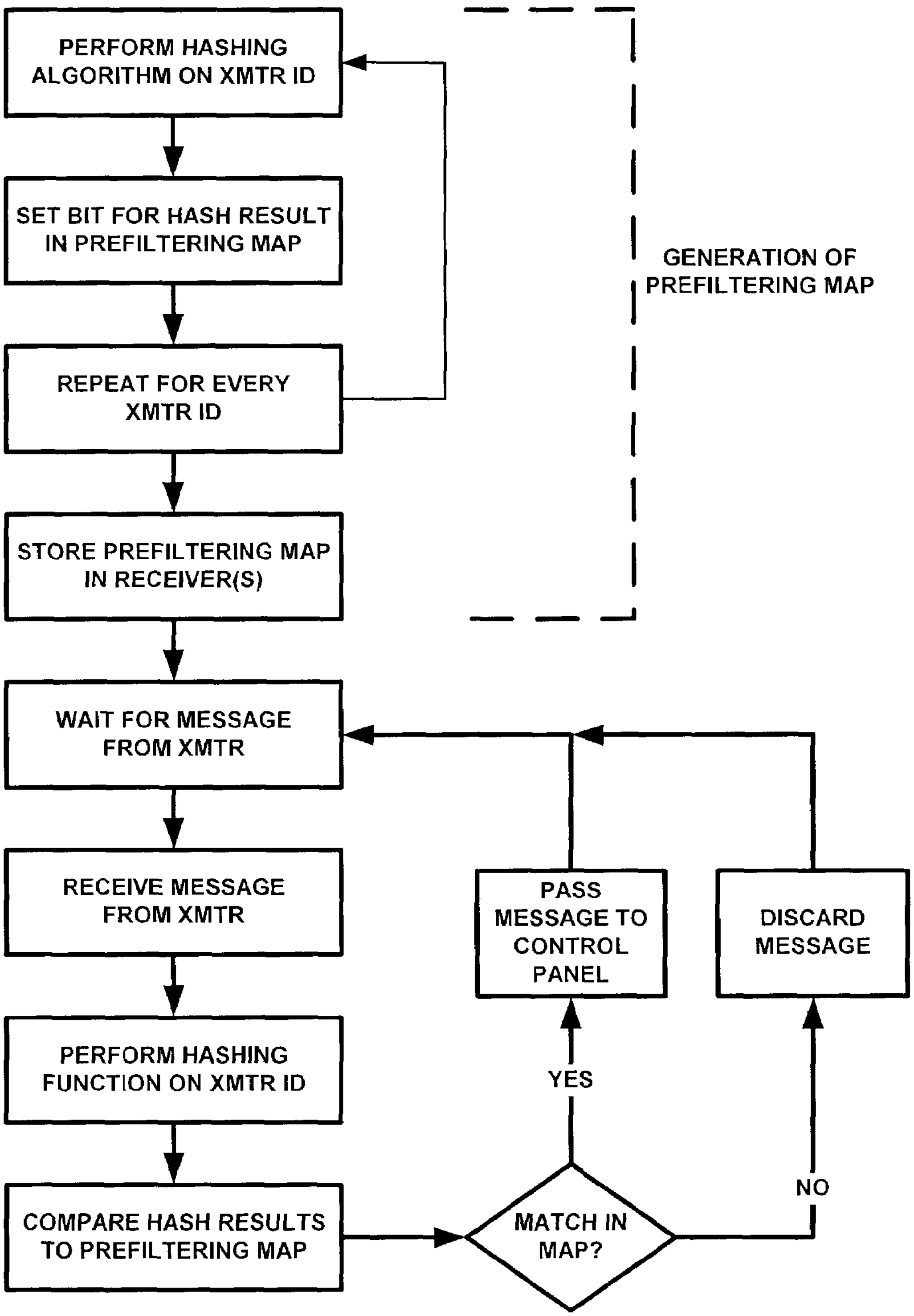
FIG. 3 is a flowchart of the operation of the present invention.

FIG. 3 illustrates the flow logic of the present invention. First, the prefiltering map is generated at the control panel. For this process, the hashing algorithm is performed on the first transmitter ID enrolled in the control panel. A bit, which corresponds to the result of the hashing function, is set in the prefiltering map. This process is repeated for every transmitter ID enrolled with the control panel. After the prefiltering map is completed, it is sent to all of the receiver modules in the security system, and stored in the internal memory of each module. During normal operation, the receiver module waits for an RF message, and once a message is received it will take the transmitter ID from the incoming message and perform the hashing function on the ID. The receiver module will then take the result of the hashing function and compare it to the prefiltering map previously obtained from the control panel. If there is a match, then the message is passed on to the control panel; if no match, the message is discarded.

Figure 4:
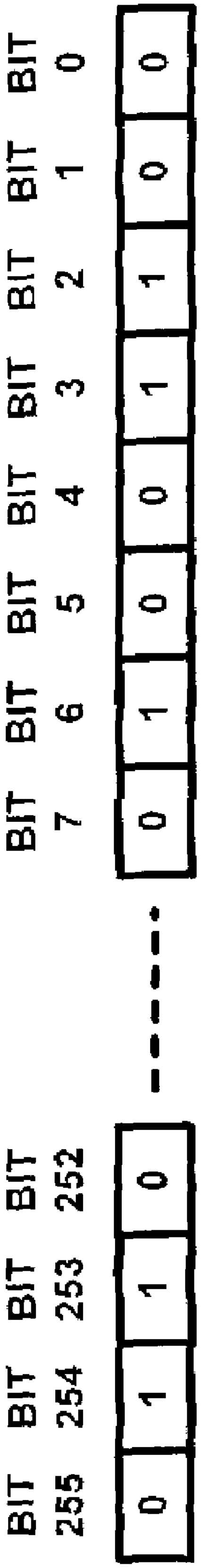
FIG. 4 is an exemplary illustration of a prefiltering map utilized in the present invention.

FIG. 4 shows an example of a prefiltering map used in this invention. In FIG. 4, a single 256-bit word is stored, with each bit position corresponding to a single 8-bit result of the hashing function. For example, if the hashing function produces a result 00000011, the bit-3 is set to logic 1 as shown in FIG. 4.

The circuitry used to execute the hashing function and produce the prefiltering map in the control panel may be accomplished with an appropriately programmed microprocessor, an ASIC, or any combination of discrete logic as appropriate to carry out the desired function as well known in the art. Likewise, the circuitry used to execute the hashing function and compare it to the stored prefiltering map in the receiver may be accomplished with an appropriately programmed microprocessor, an ASIC, or any combination of discrete logic as appropriate to carry out the desired function as well known in the art.

What is claimed is:

1. In a security system comprising a plurality of wireless transmitters, each having a unique identification number, at least one wireless receiver module in communication with each of the transmitters, and a control panel connected to the receiver module for processing signals sent from the transmitters to the receiver module, a method of prefiltering the received wireless signals comprising the steps of:

a) generating a prefiltering map comprising the steps of:
   i. for each of the transmitters in the security system, performing an algorithm on the identification number of the transmitter;
   ii. storing the result of the algorithm in a prefiltering map;
b) storing the prefiltering map in the receiver module;
c) for each wireless message received by the receiver module from a transmitter, the receiver module performing the steps of:
   i. extracting from the message the identification number of the transmitter that transmitted the message;
   ii. performing the algorithm on the extracted identification number;
   iii. comparing the result against the prefiltering map in the receiver module;
   iv. forwarding the message to the control panel if the comparison result is true; and
   v. discarding the message if the comparison result is false;

wherein the prefiltering map is not modified as a result of forwarding the message to the control panel if the comparison result is true or discarding the message if the comparison result is false.

2. The method of claim 1 in which the step of performing an algorithm on the identification number of the transmitter comprises the step of performing a hashing function on the identification number.

3. The method of claim 2 in which the step of performing a hashing function produces an N-bit result, wherein N is in the range of 4-8 bits.

4. The method of claim 3 in which the prefiltering map has $2^N$ bit positions, and in which a bit is set in the map in the position that corresponds to the result of the hashing function for each transmitter.

5. The method of claim 4 in which the comparison result is true when the result of the hashing function for a received transmitter message has a bit set in the prefiltering map.

6. A security system comprising:

a) a plurality of wireless transmitters, each comprising a unique identification number,
b) at least one wireless receiver module in communication with each of the transmitters, and
c) a control panel connected to the receiver module for processing signals sent from the transmitters to the receiver module, wherein the control panel comprises:
   i. means for generating a prefiltering map for storage at the receiver module, said means comprising means for performing, for each of the transmitters in the security system, an algorithm on the identification number of the transmitter; and
   ii. means for assembling the results of the algorithm into a prefiltering map; and wherein the at least one wireless receiver module comprises
   i. means for storing the prefiltering map obtained from the control panel;
   ii. means for extracting, from each wireless message received by the receiver module from a transmitter, the identification number of the transmitter that transmitted the message;
   iii. means for performing the algorithm on the extracted identification number;
   iv. means for comparing the algorithm result against the prefiltering map in the receiver module;
   v. means for forwarding the message to the control panel if the comparison result is true; and
   vi. means for discarding the message if the comparison result is false;

wherein the prefiltering map is not modified as a result of forwarding the message to the control panel if the comparison result is true or discarding the message if the comparison result is false.

7. The system of claim 6 in which the means for of performing an algorithm on the extracted identification number of the transmitter comprises means for performing a hashing function on the identification number.

8. The system of claim 7 in which the means for performing a hashing function produces an N-bit result, wherein N is in the range of 4-8 bits.

9. The system of claim 8 in which the prefiltering map has $2^N$ bit positions, and in which a bit is set in the map in the position that corresponds to the result of the hashing function for each transmitter.

10. The system of claim 9 in which the comparison result is true when the result of the hashing function for a received transmitter message has a bit set in the prefiltering map.

11. A wireless receiver module for use in a security system comprising:

a) means for storing a prefiltering map, the prefiltering map comprising a plurality of bits, each of the bits corresponding to the result of an algorithm performed on a transmitter identification number;

b) means for extracting, from a wireless message received by the receiver module, an identification number of a transmitter that transmitted the message;

c) means for performing the algorithm on the extracted identification number;

d) means for comparing the algorithm result against the prefiltering map;

e) means for forwarding the message to a control panel wired thereto if the comparison result is true; and f) means for discarding the message if the comparison result is false;

wherein the prefiltering map is not modified as a result of forwarding the message to the control panel if the comparison result is true or discarding the message if the comparison result is false.

12. The receiver module of claim 11 in which the algorithm is a hashing function.

13. The receiver module of claim 12 in which the hashing function produces an N-bit result, wherein N is in the range of 4-8 bits.

14. The receiver module of claim 13 in which the prefiltering map has $2^N$ bit positions, and in which a bit is set in the map in the position that corresponds to the result of the hashing function for each transmitter.

15. The receiver module of claim 14 in which the comparison result is true when the result of the hashing function for a received transmitter message has a bit set in the prefiltering map.

16. A control panel for use in a security system comprising:

a) means for generating a prefiltering map, said means comprising means for performing, for each of a plurality of transmitters enrolled in the security system, an algorithm on the identification number of the transmitter;

b) means for assembling the results of the algorithm into a prefiltering map; and i. means for transferring the prefiltering map to a wireless receiver module connected thereto.

17. The control panel of claim 16 in which the means for performing an algorithm on the identification number of the transmitter comprises means for performing a hashing function on the identification number.

18. The control panel of claim 17 in which the means for performing a hashing function produces an N-bit result, wherein N is in the range of 4-8 bits.

19. The control panel of claim 18 in which the prefiltering map has $2^N$ bit positions, and in which a bit is set in the map in the position that corresponds to the result of the hashing function for each transmitter.

* * * * *